United States Patent [19]
Edwards et al.

[11] Patent Number: 5,109,453
[45] Date of Patent: Apr. 28, 1992

[54] OPTICAL FIBER CONNECTOR WITH LATCHING BEAM MECHANISM

[75] Inventors: Bryan T. Edwards, Camp Hill; Steven L. Flickinger, Hummelstown; David D. Sonner, Harrisburg; Jeffrey A. Zeiders, Middletown, all of Pa.

[73] Assignee: AMP Incorporated, Harrisburg, Pa.

[21] Appl. No.: 667,724

[22] Filed: Mar. 11, 1991

Related U.S. Application Data

[63] Continuation-in-part of Ser. No. 660,507, Feb. 25, 1991.

[51] Int. Cl.$^5$ .............................................. G02B 6/26
[52] U.S. Cl. ........................................ 385/90; 385/76; 385/84; 385/89; 385/92; 385/139; 250/227.11
[58] Field of Search ................. 350/96.2, 96.21, 96.22, 350/96.23; 385/56, 59, 66, 76, 78, 84, 88, 89, 90, 92, 139; 250/227.11

[56] References Cited

U.S. PATENT DOCUMENTS

| | | | |
|---|---|---|---|
| 3,960,429 | 6/1976 | Moulin | 439/551 X |
| 4,167,303 | 9/1979 | Bowen et al. | 385/59 |
| 4,611,887 | 9/1986 | Glover et al. | 385/71 |
| 4,645,295 | 2/1987 | Pronovost | 385/55 |
| 4,715,675 | 12/1987 | Kevern et al. | 350/96.2 |
| 4,736,100 | 4/1988 | Vastagh | 250/227.11 |
| 4,759,599 | 7/1988 | Yamaguchi et al. | 350/96.21 |
| 4,762,388 | 8/1988 | Tanaka et al. | 350/96.2 |
| 4,840,451 | 6/1989 | Sampson et al. | 350/96.2 |
| 4,872,736 | 10/1989 | Myers et al. | 385/60 |
| 4,960,317 | 10/1990 | Briggs et al. | 385/56 |
| 4,979,792 | 12/1990 | Weber et al. | 350/96.2 |
| 5,005,939 | 4/1991 | Arvanitakis et al. | 350/96.2 |
| 5,016,968 | 5/1991 | Hammond et al. | 350/96.2 |
| 5,037,175 | 8/1991 | Weber | 385/76 |

OTHER PUBLICATIONS

AMP Multimode Products, "Fixed Shroud Duplex System", pp. 5–18, Mar. 1989, Catalogue 88-812.

*Primary Examiner*—Brian Healy

[57] ABSTRACT

A connector for joining light transmitting fiber cable through a cover (14) to a transmitter and/or receiver device (3) comprises a plug connector half (6) comprising a plug (3) and a transceiver adapter (10). The plug (8) has profiled passageway (43) for receiving an optical fiber. The transceiver adapted (10) is an integral two-part structure comprising a transceiver shroud (11) adapted to axially receive the plug (8) and extending axially (38) for forwardly aligning the plug (8) relative to the transmitter and/or receiver device (3). The adapter (10) further comprises a latching beam mechanism (12) having forward extending latching beams (13).

9 Claims, 8 Drawing Sheets

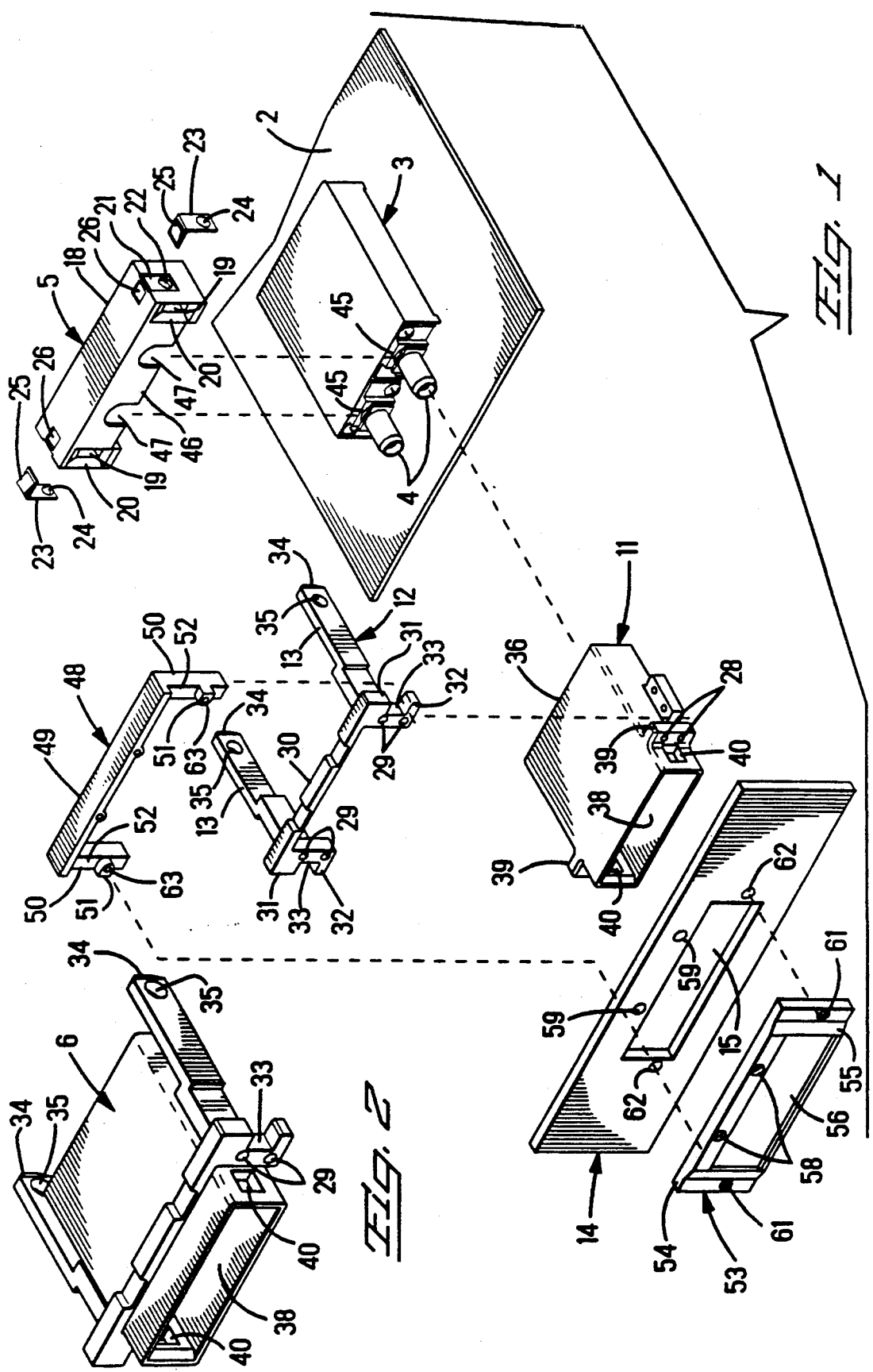

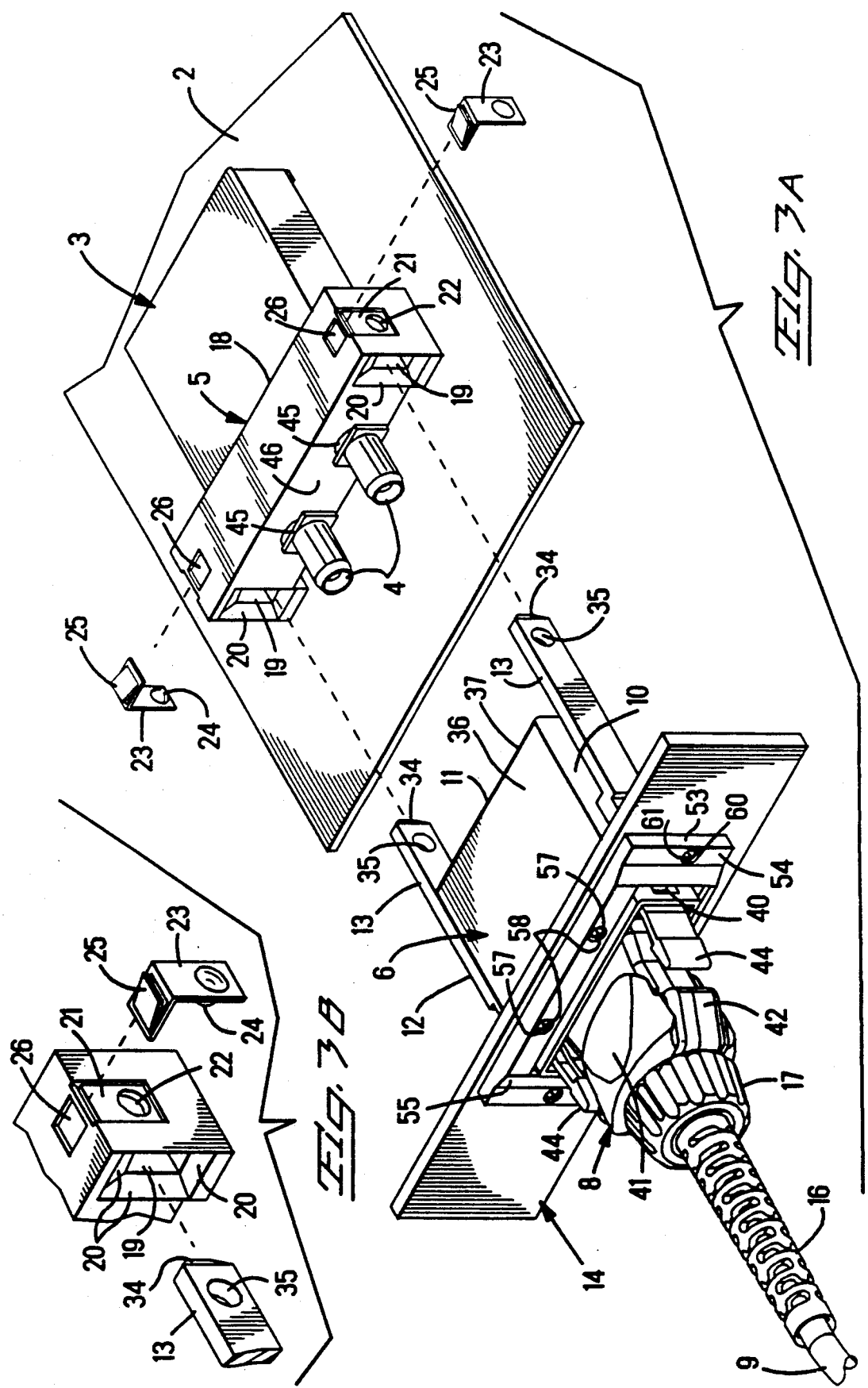

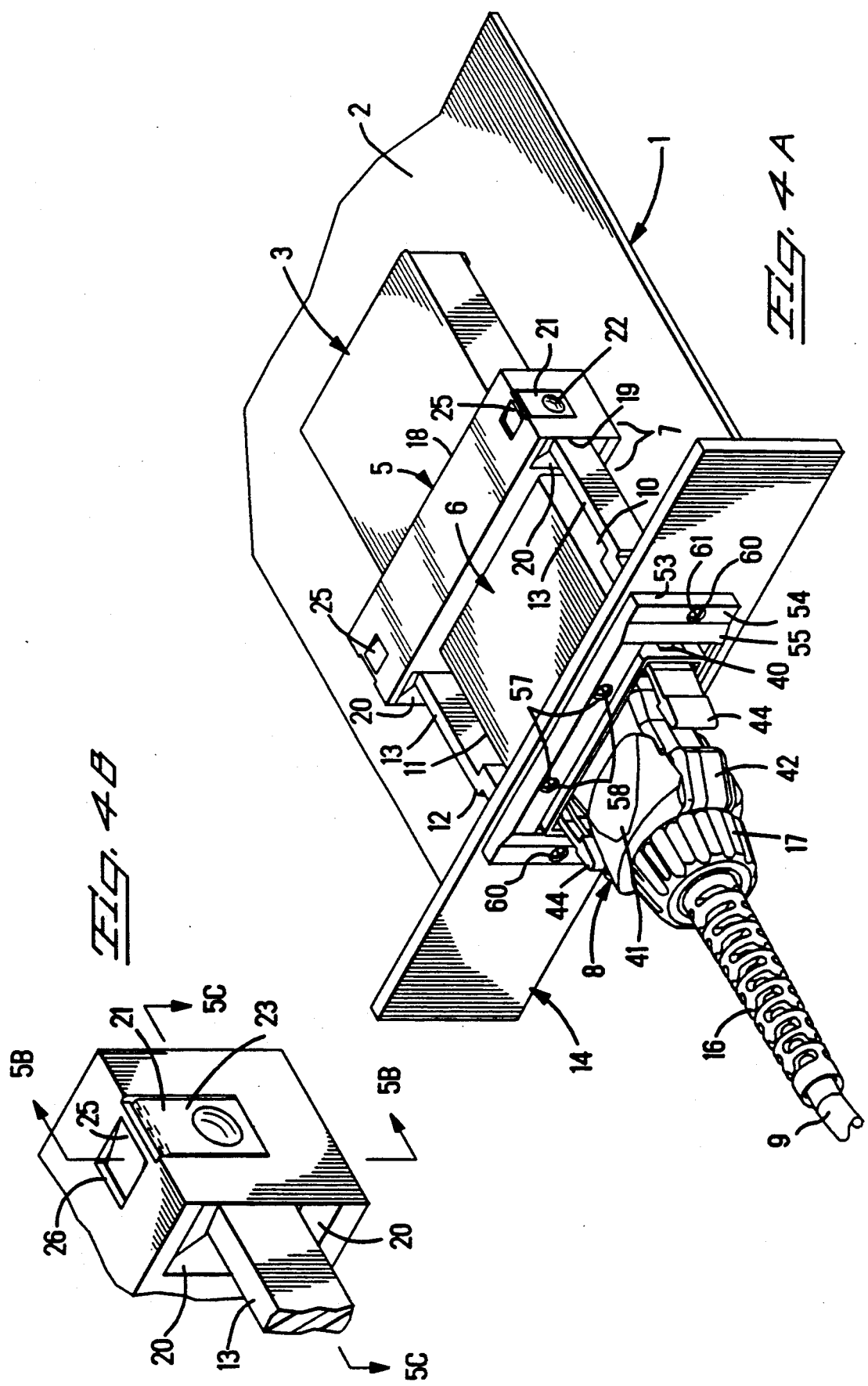

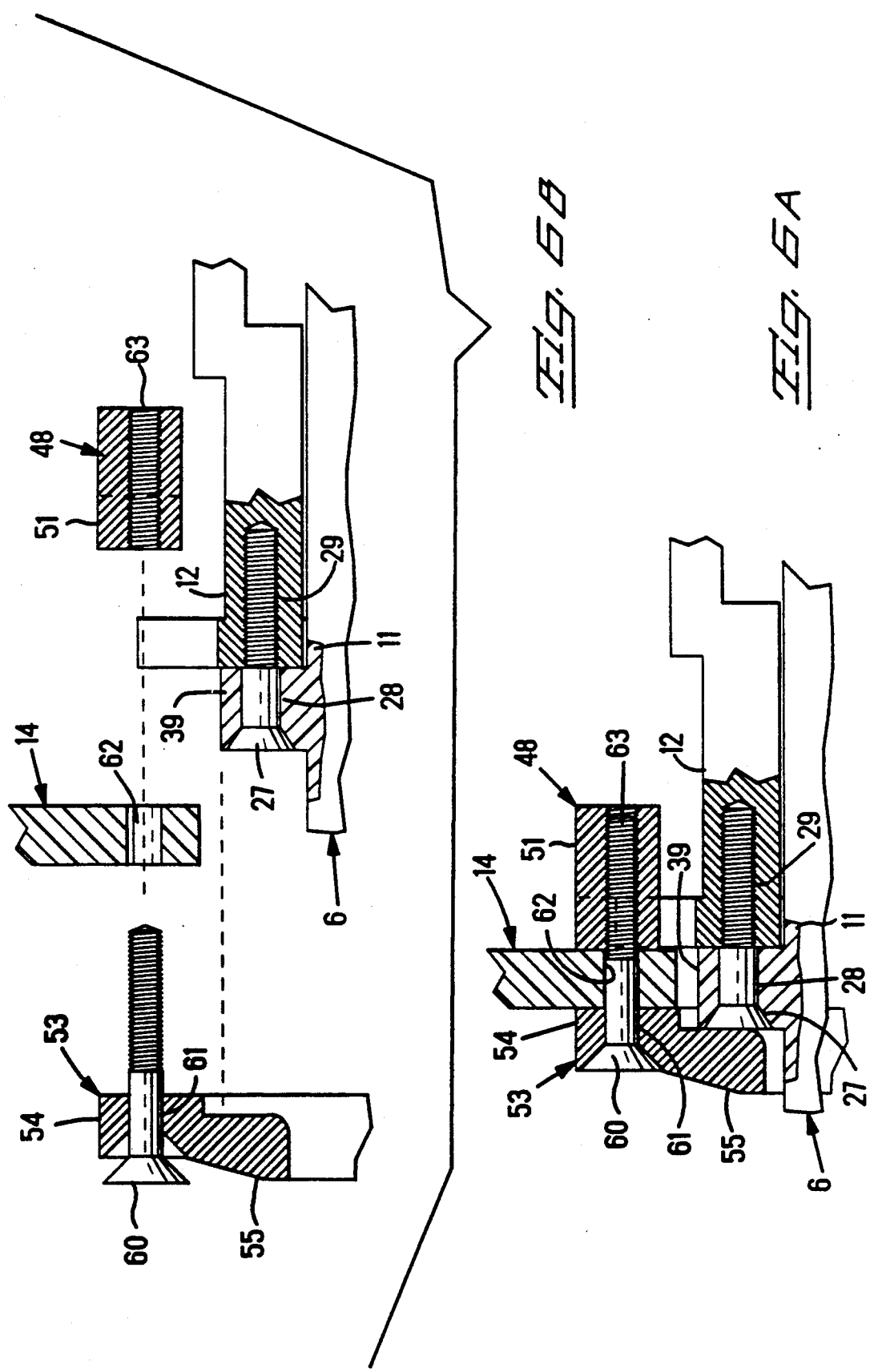

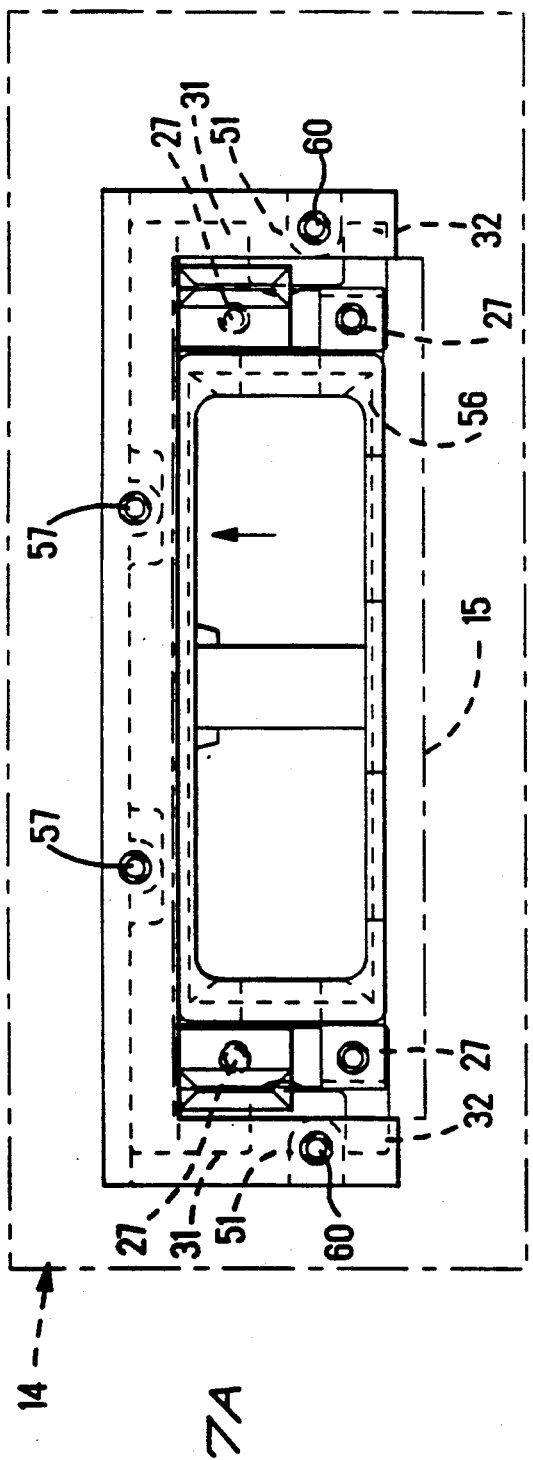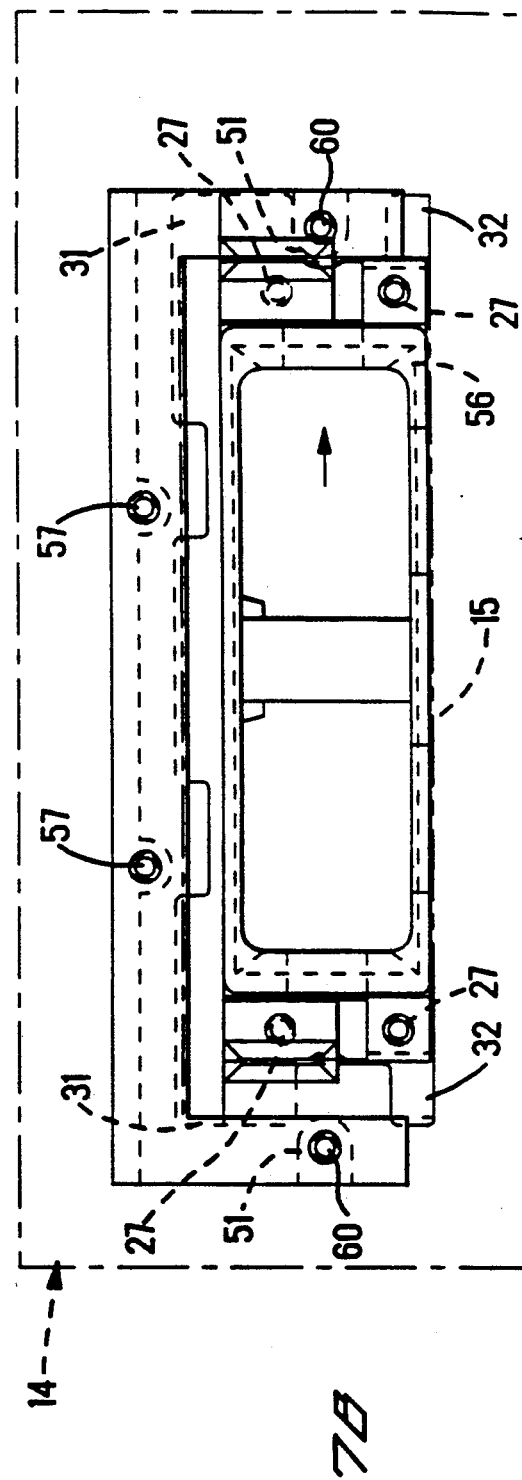

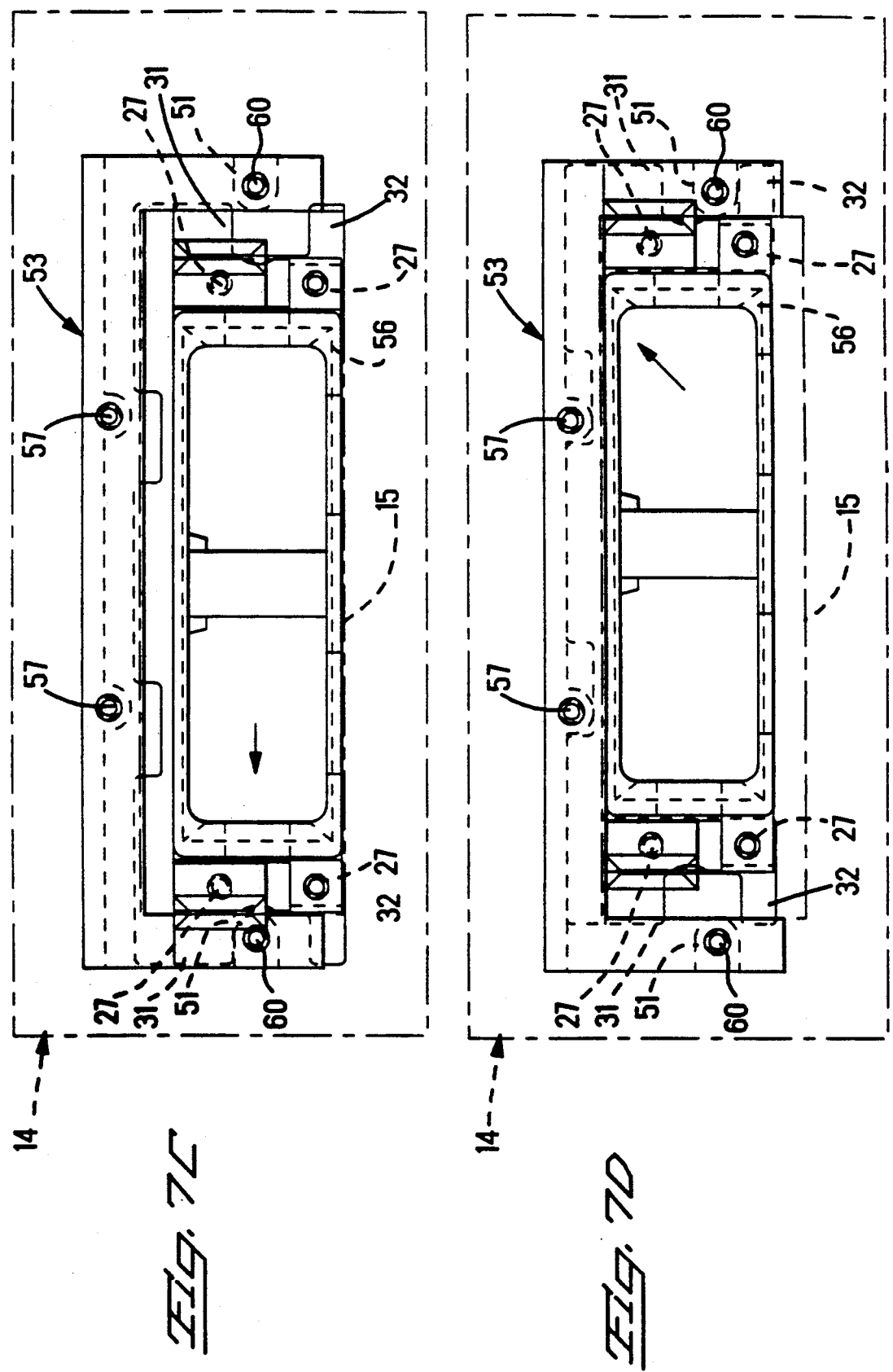

OPTICAL FIBER CONNECTOR WITH LATCHING BEAM MECHANISM

FIELD OF THE INVENTION

This application is a continuation-in-part of Briggs et al., co-pending U.S. application Ser. No. 07/660,507 filed Feb. 25, 1991, pending. The present invention relates to an optical fiber connector with an alignment feature for positioning, aligning, and guiding mating electrical or optical connector halves.

BACKGROUND OF THE INVENTION

As pointed out in the application of Briggs et al., U.S. patent application Ser. No. 07/549,789 filed Jul. 9, 1990, pending, it is standard practice with respect to mating connectors to provide means which position the connector halves so that the terminals therein are aligned for a proper mating engagement. It is common to provide pins, posts, and projections in one half made to fit within complementary apertures in the other half, both integrally molded with respect to the housings of the connector halves, or added as hardware. One problem associated with interconnecting of connector halves arises when the halves are of different suppliers and are not complementary. In such instances it is necessary to provide an adapter that alters one or both of the connector halves so as to permit interconnection.

Briggs et al. U.S. application Ser. No. 07/660,507 filed Feb. 25, 1991, pending, relates to a connector for joining light transmitting fiber cables to a transmitter and/or receiver. The connector has two halves; a plug half connector and a yoke half connector. The plug half connector comprises a plug having an axially extending bore for receiving an optical fiber, a transceiver adapter and alignment pins. The transceiver adapter is adapted to receive the plug and to align it relative to the transmitter and/or receiver device. The pins are fixed to the forward mating face of the transceiver adapter and are beveled at a forward end. The yoke half connector is attached to and is integral with the transceiver and/or receiver device. The yoke half connector has apertures each of which is beveled to receive the pins which are guided into respective aperture by the beveling.

It is an object of the present invention to provide a connector with an alignment feature that permits interconnection between connector halves of a variety of types without requiring the providing of an adapter for each such interconnection. It is further an object to provide a guide means which mounts to a structure, such as a transmitter and/or receiver, on a printed circuit board, to provide a simple and novel structure for intermating electrical and optical connectors to join cables to circuit boards. It is particularly an object of the present invention to provide an improved connection between a board mounted transmitter and/or receiver and a shrouded plug connector, as for example, a connection between a Fiber Distributed Data Interface (FDDI) and a connector of the Fixed Shroud Duplex (FSD) type.

SUMMARY OF THE INVENTION

The present invention relates to a connector for joining light transmitting fiber cables through a cover to a transmitter and/or receiver device. The connector is characterized by a latching beam mechanism that provides both an improved aligning feature during intermating and improved retention while interconnected.

The connector comprises a plug connector half and a clip connector half. The plug connector half comprises a plug having an axially extending bore for receiving an optical fiber, and a transceiver adapter adapted to axially receive the plug through the cover. The transceiver adapter extends axially for aligning the plug forward relative to the transmitter and/or receiver device. The transceiver adapter is a two-part structure comprising a transceiver shroud and a latching beam mechanism. The shroud is adapted to axially receive the plug and extends axially for forward alignment of the plug relative to the transmitter and/or receiver device. The latching beam mechanism is integral with the shroud and has forward extending latching beams. The mechanism comprises a main body straddling the shroud and secured thereto, and having latching beams extending therefrom. Each latching beam is an elongated structural member which is secured at one end to the main body of the mechanism and which is freely flexible at the forward opposite end. Each beam has a forward beveled face and port.

Further, the connector comprises a clip connector half attached to and integral with the transmitter/receiver device and having apertures therein beveled to receive the latching beams. Each of the latching beams has a beveled forward end for interacting with the respective beveled aperture of the clip connector half to align the beam to the opening upon mating of the plug connector half to the clip connector half. Each of the latching beams has a port toward its forward end. The port is transverse to the longitudinal axis of the beam. The clip connector half further comprises a clip retention window coextensive to each aperture through a port common to both the retention window and the aperture. The clip connector half further comprises a clip with a dimple adapted to clip within each of the retention windows with the dimple biased through the port in the window and into engagement with the latching beam through the port of the beam upon mating of the plug connector half to the clip connector half.

The transmitter and/or receiver device may have mounts projecting therefrom for connecting each transmitter and/or receiver to a respective optical fiber cable which extend forward within the axial bore of the plug. Each mount has a square base which forms flanges. The clip connector half further comprises a face with arc-shaped openings for clip fit to the flanges of the mounts of the transmission and/or receiver device.

Further, the connector may comprise means associated with the plug for securing the plug within the transceiver adapter. The means may be at least one deflectable latch, with the latch cooperating with a respective port of the transceiver adapter. Further included may be a strain relief means including a tubular member with integral means for distributing bending substantially along the length of the strain relief. Means may be included on the plug and on the strain relief means to retain the strain relief means and the plug in assembled relation. With this, the plug is provided with a threaded end, and, further provided is a cap with a threaded bore complementary to the threaded end and having a bore of deceased opening for capturing the strain relief.

During interconnection, connector halves intermate with one another through the connection envelope which is the area through which each half must pass in approaching so as to accomplish fit of one half to the other. The envelope may be enlarged to accommodate a greater area of misalignment by the utilization of certain mechanisms such as the complementary beveled pin and aperture surfaces of Briggs et al., wherein the beveled surfaces permit the guiding of the pin heads from a misaligned juxtaposition to an entry into the corresponding accepting apertures of the clip connector half. Because of the flexibility of the latch beams of the mechanism of the present invention, the connection envelope, for a connector half characterized by the latch beams, is enlarged, and a greater misalignment for a complementary connecting half can be accommodated.

Further, the beams show improved durability as compared to prior art alignment features. Because they are of improved flexibility, the beams are less apt to snap off during a mating involving a gross misalignment.

Finally, once intermated, the latch beams of the mechanism provide an improved retention over previously known connecting and/or alignment features.

BRIEF DESCRIPTION OF THE DRAWINGS

FIG. 1 is a perspective view, partially exploded, of the connector with latching beam mechanism of the present invention along with a cover and transmitter and/or receiver device.

FIG. 2 is a perspective view of a molded single piece transceiver adapter, one of the embodiments of the present invention.

FIG. 3A is a perspective view showing connector halves preparatory to mating, along with associated mounting structures, and FIG. 3B is an exploded perspective view of the condition between a latching beam and aperture showing the clip retention window and clip.

FIG. 4A is a perspective view showing mated connector halves along with associated mounting structures, and FIG. 4B is a perspective view of a connected latching beam and aperture.

FIG. 6A is a cut away view through the interconnection among the cover plate, panel and half structure of FIG. 4A, and FIG. 6B is a cut away view through the same but with some parts exploded.

FIGS. 7A, 7B, 7C, 7D and 7E are all side elevation views from a rear position showing the panel front and the connector of the present invention.

DESCRIPTION OF A PREFERRED EMBODIMENT

Figure 5C:
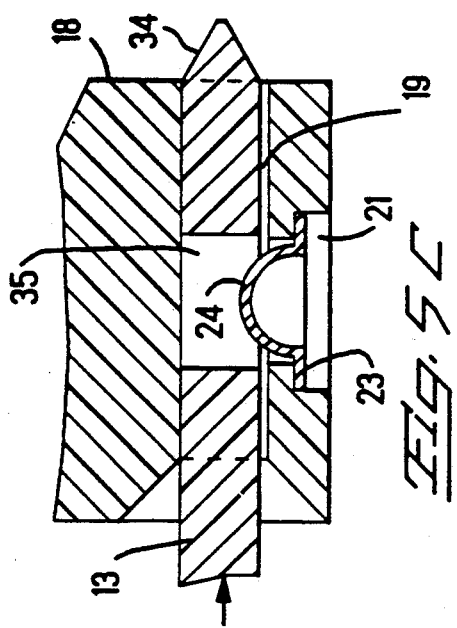
FIG. 5C is a cut away view through line 5C—5C of FIG. 4B.

Referring to FIGS. 1, 3A, 3B, 4A and 4B, an electronic package 1 is shown to include a mounting structure 2 which may be a printed circuit board carrying circuit traces to electronic components such as logic and memory devices. Mounted on structure 2 is a transmitter/receiver device 3 which includes a pair of signal ports 4 suitably interconnected to components which convert electrical to optical and optical to electrical signals, i.e. transmitters and receivers. Shown also, is clip connector 5 which is a connector connector half, and which, with half structure 6, comprises the connector 7, FIG. 4A, of the present invention as hereinafter described.

Half structure 6 includes plug 8 terminating a cable 9 to a forward portion, and transceiver adapter 10, FIG. 3A. Transceiver adapter 10 is shown as a two part structure comprising a transceiver shroud 11 and latching beam mechanism 12, FIG. 1. Transceiver shroud 11 is adapted to axially receive plug 8. The shroud 11 extends axially for aligning the plug relative to the transmitter/receiver device 3. The latching beam mechanism 12 has latching beams 13 extending therefrom. The connector half 6 is mounted, as indicated, in a mounting structure which may be considered, in the embodiment here involved, as a panel front or cover 14 which encloses the interconnection when the connector halves 5, 6 are mated through window 15 of the panel front 14.

The plug connector half 6 further comprises strain relief means 16 which is a tubular member with integral means for distributing bending substantially along its length. The plug 8 has a threaded end (not shown). Cap 17 has a threaded bore complementary to the end of the plug 8, and has a bore for capturing the strain relief 16 when the cap 17 is inter-engaged with the threaded end of the plug 8.

Figure 5A:
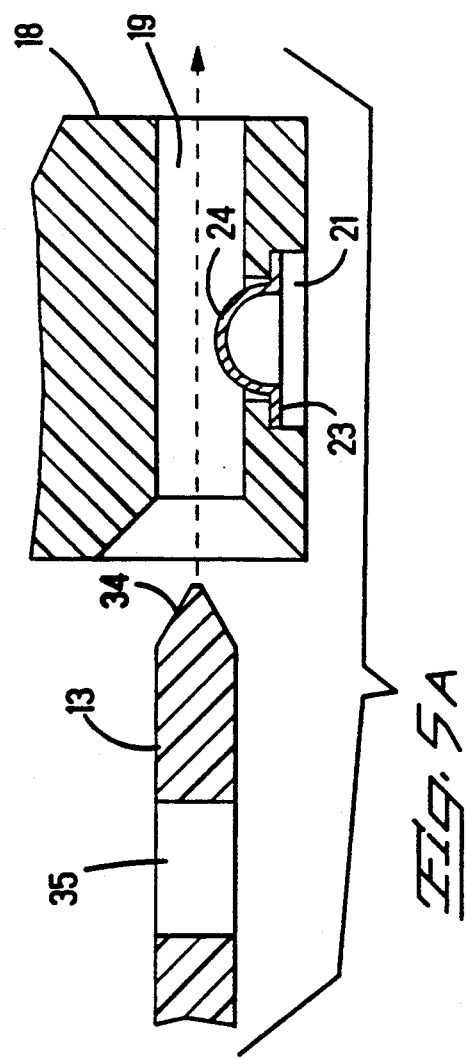
FIG. 5A is a cut away view of latching beam, aperture and clip during mating.
Figure 5B:
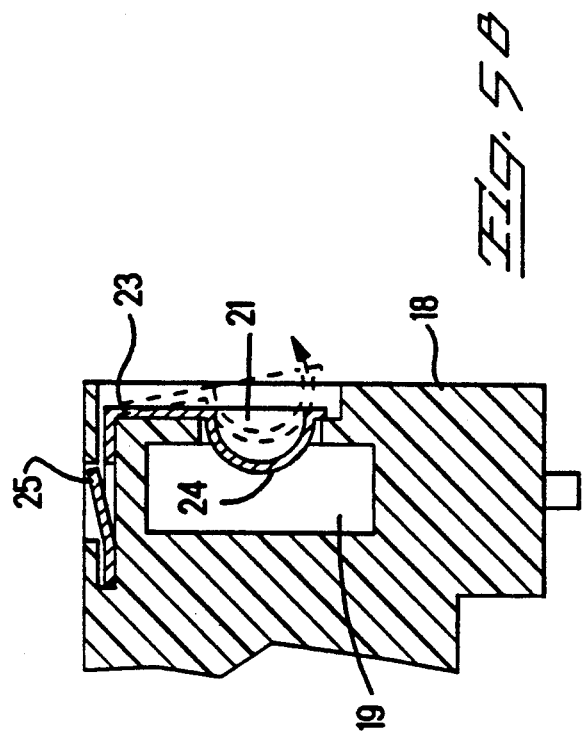
FIG. 5B is a cut away view through line 5B—5B of FIG. 4B.

Shown in FIGS. 1, 3A, 3B, 4A, 4B, 5A, 5B and 5C, clip connector half 5 comprises a cover body 18 having apertures 19 which are beveled 20 to receive latching beams 13 which, upon connection, are guided into the apertures 19 by the beveling 20. Clip connector half 5 further comprises clip retention window 21 coextensive with each of apertures 19 through port 22 common to both the retention window 21 and the aperture 19, and further comprises clips 23 each with dimple 24. Each clip 23 has wing 25 which is a portion of the clip 23 biased upward to form the said wing 25 with function as hereinafter described. As illustrated in FIGS. 5A, 5B and 5C, the clips 23 are adapted to fit within respective retention window 21 with dimple 24 biased through respective port 22 in the window 21 and wing 25 providing retention by snap fit within a second window 26 of the connector half 5.

The transceiver adapter 10 may be a molded integral structure as shown in FIG. 2 characterized by a transceiver shroud portion 11 and latching beam mechanism portion 12 or the adapter 10 may be a two part structure, as shown in the FIGS. 1, 3A and 4A, comprising a transceiver shroud part 11 and a latching beam mechanism 12 secured together with an inter-engaging means to form said integral two part structure—the transceiver adapter 10. The inter-engaging means may be bolts 27, FIG. 6A, through the commonly aligned holes 28 of the transceiver shroud 11 and holes 29 of the latching beam mechanism 12.

Referring to FIGS. 1, 3A and 4A, latching beam mechanism 12 is in the form of a main body 30 having latching beams 13 extending therefrom and side extending flanges, both upper 31 and lower 32, which define a gap 33 with utility as hereinafter described. Each latching beam 13 is a beam shaped body with forward beveled face 34 and port 35. When interconnected to form transceiver adapter 10, the main body 30 of the latching beam mechanism 12 straddles shroud 11 with inter-engaging holes 29 aligned with holes 28 of the shroud 11 as aforesaid.

Transceiver shroud 11 consists of a body 36 having forward mating face 37, axial cavity 38 the receive the plug 8, extending flanges 39 with holes 28 and latch ports 40 to both sides of 36.

Plug 8, FIGS. 3A and 4A, is constructed for disconnect coupling through means of transceiver adapter 10 and is a hollow body of molded upper cover 41 and molded lower cover 42. The covers 41, 42 are of insulated plastic material formed by molding into a shape that has an exterior with dimensions that intermate with the transmitter/receiver via transceiver adapter 10. Upper cover 41 and lower cover 42 are complementarily contoured in their interiors so as to form a profiled passageway having optical cables disposed therein. Upper cover 41 intermates with lower cover 42 by snap-in connection. Threaded cap 17 secures the upper cover 41 together with the lower cover 42 to encompass and provide an enclosure for the optical fibers of optical cable 9. The plug 8 is secured within the transceiver adapter 10 by biased fit of latches 44 through latch ports 40.

Further shown in FIGS. 1, 3A and 4A is transmitter/receiver device 3 and clip connector half 5. Transmitter/receiver ports 4 have square bases which form flanges 45. Clip connector half 5 is formed of cover body 18 having mating face 46 characterized by openings 47 which form lips that snap fit onto flanges 45.

With reference to FIGS. 1, 3A, 3B, 4A, 4B, 5A, 5B and 5C, during connection of plug connector half 6 with clip connector half 5, the apertures 19 of clip connector half 5 receive respective latching beams 13 of plug connector half 6 with each bevel 20 interacting with the respective beveled face 34 of each latching beam 13 to guide each latching beam 13 into a respective receiving aperture 19. Simultaneously, transceiver/receiver device 3 passes into axial cavity 38 of transceiver shroud 11 thereby connecting the transmitter and/or receiver 3 to a respective optical fibers of plug connector 8 disposed within the transceiver shroud 11.

Again, with reference to FIGS. 1, 3A, 4A, 6A, 6B, 7A, 7B, 7C, 7D and 7E, shown is the floating fit of the transceiver adapter 10 which permits alignment to transmitter/receiver device 3 and to clip connector half 5 even in circumstances where these elements may be misaligned thus prohibiting proper mating with prior art transceiver adapters 10 and associated mountings. Shown is a retention frame 48 with main body 49 and extending arms 50 each with rearward extending pedestals 51 which, with rearward extending main body 49 define gaps 52. Retention frame 48 is adapted to straddle transceiver adapter 10 and be immobilized by a secure connection to cover 14 which is provided by an interconnection to cover plate 53. Cover plate 53 has two sections, a relatively flat section 54, the bottom of which fits flush to cover 14, and an outcrop section 55 that rises from the plane of the flat section 54 and which defines cover plate window 56. Cover plate 53 is secured to cover 14 by bolts 57, FIGS. 3A and 4A, or the like through holes 58 of cover plate 53 and holes 59, FIG. 1, of cover 14. The interconnection means between retention frame 48 and plate 53 may be a bolt 60 or the like through commonly aligned holes 61 of cover plate 53, holes 62 of cover 14 and holes 63 of retention frame 48.

With the straddling of retention frame 48 over transceiver adapter 10, and the interconnection of the frame 48 to cover 14 and to plate 53, pedestals 51 fit within respective gaps 33 of latching beam mechanism 12. Each gap 52 of retention frame 48 is particularly defined by main body 49 and pedestal 51 so as to loosely accommodate respective flange 31 of latching beam mechanism 12, and gap 33 of latching mechanism 12 is particularly defined by respective upper 31 and lower 32 flanges so as to loosely accommodate respective pedestal 51 of frame 48 whereby transceiver adapter 10 is captivated by retention frame 48 but in such a manner as to permit vertical movement of the adapter 10 within same frame 48 and relative to said cover 14. Further, the spacing between the pedestals 51 exceeds the distance between the gaps 33 so that the transceiver adapter 10 is permitted horizontal movement as well.

Figure 7E:
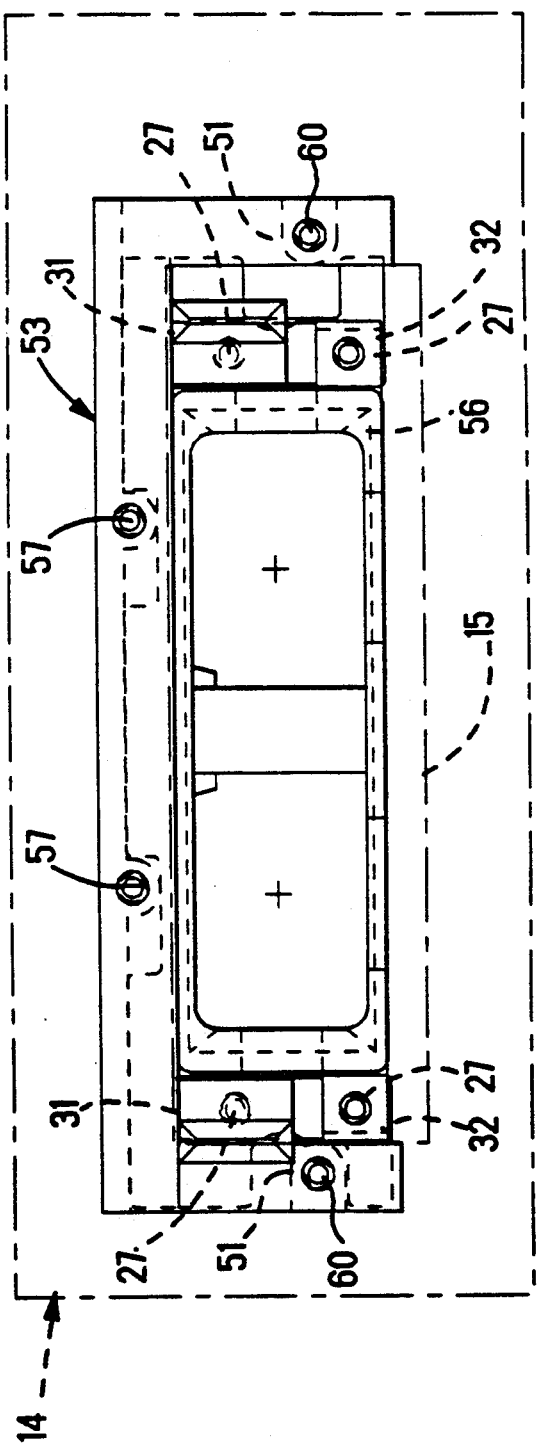

FIGS. 6A and 6B show the connection among the retention frame 48, panel front 14 and cover plate 53, the connection of the transceiver shroud 11 and latch beam mechanism 12 and the floating fit of shroud 11 and latch beam mechanism 12 within the combination of retention frame 48, panel front 14 and cover plate 53, while FIGS. 7A, 7B, 7C, 7D and 7E further illustrate the floating of the transceiver adapter 10 within the fixed structure which is the combination of the retention frame 48, the panel front 14 and the cover plate 53. During mating of plug 8—as encompassed within transceiver adapter 10—with the transmitter/receiver device 3 misalignment may require that plug 8 be slightly elevated with respect to cover 14 in order to permit mating. FIG. 7A shows the combined structure of the retention frame 48, panel front 14 and cover plate 53 permitting the upward floating of the plug 8 and transceiver adapter 10 therewithin to facilitate mating. Correspondingly, FIG. 7B shows the plug 8 and transceiver adapter 10 floating to the right for mating; FIG. 7C shows floating to the left; FIG. 7D, floating upward and to the right; and FIG. 7E, floating upward and to the left.

During connection of half structure 6 to clip connector half 5, as illustrated in FIGS. 5A, 5B and 5C, latching beams 13 approach respective clip retention windows 21 with beveled face 34 of each beam 13 contacting beveling 20 of respective clip retention window 21. The beveling 20 of the retention window 21 leads the beam 13 into aperture 19. As mating takes place the floating of the transceiver adapter 10 and plug 8 permits adjustment of the alignment of the beam 13 to the aperture 19 along the face of beveling 20. At the same time, the floating feature permits alignment of signal ports 4 of the transmitter/receiver device 3 to respective optical fibers disposed by ferrules (not shown) within plug 8. As the beam 13 progresses within aperture 19, beveled face 30 contacts dimple 24 of clip 23. Beveled face 34 imposes against dimple 24, which is biased into aperture 19 through port 22. Beveled face 34 pushes dimple 24 against the bias and to without the port 22 permitting beam 13 to progress up aperture 19. Dimple 24 snaps back into aperture 19 and into seat within port 35 of the latching beam 13, as port 35 becomes aligned with the port 22. The snap fit of the dimple 24 into port 35 retains the beam 13 within the aperture 19 of the clip half 5 with a predetermined retention force.

Illustrated has been the latching beam mechanism of the present invention in conjunction with a connector having a float fit feature. While this description constitutes a presently preferred embodiment of the invention, it should be recognized that the connector 7 of the present invention may take other forms so long as it is characterized by a transceiver adapter 10 which is a two-part structure comprising a transceiver shroud 11 and, integral therewith, a latching beam mechanism 12 having forward extending latching beams 13. Accordingly, it should be understood that the invention is to be limited only insofar as required by the scope of the following claims.

We claim:

1. A connector for aligning optical fibers of a light transmitting fiber cable with ports of a transceiver, comprising:

a plug connector half connected to a light transmitting cable having optical fibers, and a transceiver adapter comprising; a shroud adapted to receive the plug connector half and to align optical fibers of the plug connector half with ports of a transceiver, and a latching beam mechanism secured to the shroud, the latching beam mechanism comprising; elongated latching beams extending from the shroud, mounting means for mounting the latching beams to the shroud, and a connector half receiving ports of a transceiver, the connector half having beveled apertures adapted for receiving the forward ends of the latching beams to align optical fibers of a plug connector half received by the shroud with respective ports received by the connector half.

2. A connector as recited in claim 1, and further comprising: the forward ends of the latching beams being beveled for alignment with the beveled apertures of the connector half.

3. A connector as recited in claim 1, and further comprising: clips in respective apertures of the connector half engaging the forward ends of the latching beams received by the respective apertures.

4. A connector as recited in claim 3, and further comprising: projecting dimples of the clips being biased toward the respective apertures of the connector half for receipt in respective ports in the latching beams.

5. A connector as recited in claim 1, and further comprising: second mounting means for mounting the latching beam mechanism to a front panel, comprising; a retention frame secured to the front panel, the latching beam mechanism being supported by the retention frame for movement along the panel relative to a window through the front panel.

6. A connector as recited in claim 5, and further comprising: a cover plate secured to the front panel encircling the window through the front panel.

7. A connector as recited in claim 5, and further comprising: pedestals of the retention frame received in corresponding gaps of the latching beam mechanism, and the latching beam mechanism being moveable relative to the pedestals.

8. A connector as recited in claim 7, and further comprising: a main body of the latching beam mechanism secured to the shroud, and the gaps being disposed between spaced apart flanges of the main body.

9. A connector as recited in claim 8, and further comprising: the main body straddling the shroud.

* * * * *